J. EVELAND.
MODE OF CONNECTING FELLIES OF WHEELS.

No. 36,774. Patented Oct. 28, 1862.

Witnesses
J. W. Coombs
G. W. Reed

Inventor;
Josiah Eveland
per Munn & Co
Attorneys

UNITED STATES PATENT OFFICE.

JOSIAH EVELAND, OF ELIZABETH CITY, NEW JERSEY.

IMPROVED MODE OF CONNECTING FELLIES OF WHEELS.

Specification forming part of Letters Patent No. 36,774, dated October 28, 1862.

*To all whom it may concern:*

Be it known that I, JOSIAH EVELAND, of Elizabeth City, in the county of Union and State of New Jersey, have invented a new and Improved Mode of Connecting together the Eends of Wheel-Fellies; and I do hereby declare that the following is a full, clear, and exact description of the same, reference being had to the accompanying drawings, making a part of this specification, in which—

Figure 1:
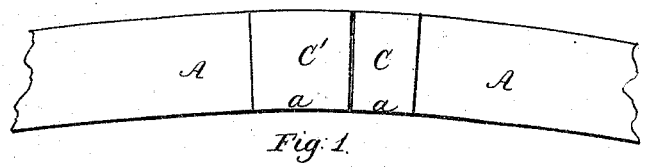
Figure 2:
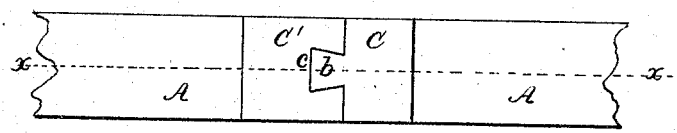
Figure 3:
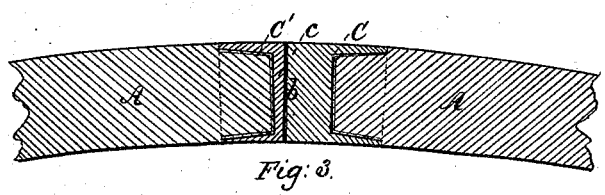
Figure 4:
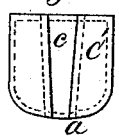
Figure 5:
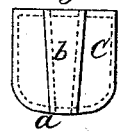

Figure 1 is a side view of my invention; Fig. 2, an outer view of the same; Fig. 3, a longitudinal section of the same, taken in the line $x\ x$, Fig. 2; Figs. 4 and 5, end views of the two parts which comprise the same.

Similar letters of reference indicate corresponding parts in the several figures.

The object of the invention is to obtain a coupling for connecting together the ends of wheel-fellies in such a manner that they will not be liable to be depressed or forced inward under the weight to which the wheels may be subjected when attached to the vehicle, and at the same time admit of being very readily applied to the fellies, form a firm connection and one capable of being adjusted with the greatest facility in order to form the connection.

To enable those skilled in the art to fully understand and construct my invention, I will proceed to describe it.

A A represent the ends of two fellies, and C C' are two metal sockets, into which the ends of the fellies A A are fitted, and secured therein by pins or screws, if desired. These, however, may be dispensed with. These sockets are rounded at their inner sides, as shown at $a$, Figs. 1, 4, and 5, to correspond to the inner rounded side of the fellies. The end of the socket C is provided with a dovetail tenon, $b$, which extends the whole depth or thickness of the socket, and is of taper or dovetail form both longitudinally and transversely. The longitudinal taper is shown clearly in Fig. 5, and the transverse taper in Fig. 2. The widest portion of the tenon transversely is at its outer end, as shown in Fig. 2, and the widest portion longitudinally is at its upper end, as shown in Fig. 5. The socket C' is provided at its outer end with a dovetail recess, $c$, which in form corresponds inversely with the tenon $b$, and is of such dimensions as to admit of the latter fitting snugly into it, so that the inner and outer surfaces of the two sockets will be flush with each other, as shown in Figs. 1 and 3. The transverse taper, it will be seen, prevents the two sockets being drawn apart, while the longitudinal taper prevents the two sockets being depressed or forced inward, one past the other. They are of course prevented from being disconnected by an outward movement by the tire, which may be shrunk on the wheel, as usual. By this very simple device a firm and substantial coupling is obtained, one which admits of being very readily applied to the fellies, and also readily adjusted together in order to form the connection. When the connection is formed, the fellies cannot withdraw from the sockets C C', as they are confined in the form of a circle, and, with the sockets, are held in proper position by the tire.

The sockets may be of malleable cast-iron. That would probably be the most preferable material.

I do not claim, broadly, a dovetail as my invention; but,

Having thus described my invention, what I claim as new, and desire to secure by Letters Patent, is—

Having the sockets C C' provided, respectively, with a tapering dovetail tenon and a tapering dovetail recess, fitting and operating together in the manner herein shown and described, so as to form a firm but easily separable connection between the ends of the fellies and prevent all lateral and inward spreading or bending of the felly ends, as set forth.

JOSIAH EVELAND.

Witnesses:
R. GAWLEY,
JAMES LAIRD.